United States Patent [19]

Nishioka

[11] Patent Number: 4,799,148

[45] Date of Patent: Jan. 17, 1989

[54] INTERRUPT CONTROL SYSTEM HAVING A PROCESSOR FOR DETERMINING SERVICE PRIORITY AMONG A PLURALITY OF MODULES ACCORDING TO AN INTERRUPT STATUS TABLE

[75] Inventor: Syoji Nishioka, Fujinomiya, Japan

[73] Assignee: Kabushiki Kaisha Toshiba, Kawasaki, Japan

[21] Appl. No.: 792,559

[22] Filed: Oct. 29, 1985

[30] Foreign Application Priority Data

Oct. 30, 1984 [JP]  Japan ................................ 59-228529

[51] Int. Cl.⁴ ............................................. G06F 13/24
[52] U.S. Cl. ................................................... 364/200
[58] Field of Search ... 364/200 MS File, 900 MS File; 340/825.12

[56] References Cited

U.S. PATENT DOCUMENTS

| | | | |
|---|---|---|---|
| 3,836,889 | 9/1974 | Kotok et al. | 364/200 |
| 3,905,025 | 9/1975 | Davis et al. | 364/200 |
| 4,151,592 | 4/1979 | Suzuki | 364/200 |
| 4,352,157 | 9/1982 | Namimoto et al. | 364/200 |
| 4,420,806 | 12/1983 | Johnson, Jr. et al. | 364/200 |
| 4,495,569 | 1/1985 | Kagawa | 364/200 |
| 4,628,447 | 12/1986 | Cartret et al. | 364/200 |
| 4,630,041 | 12/1986 | Casamatta | 364/200 |

FOREIGN PATENT DOCUMENTS 53-72541  6/1978  Japan.
59-99521  8/1984  Japan.

Primary Examiner—Raulfe B. Zache
Assistant Examiner—Emily Y. Chan
Attorney, Agent, or Firm—Finnegan, Henderson, Farabow, Garrett, & Dunner

[57] ABSTRACT

An interrupt control apparatus in a data processing system has a central processing unit (CPU) and a plurality of modules which are connected to a common bus. Interrupt request lines between the modules and the CPU are wired-OR. Each module activates the corresponding interrupt request line upon generation of an interrupt and, at the same time, sets an interrupt flag inherent thereto in an interrupt status table in the main memory. When the interrupt request line is active, the CPU begins to poll the interrupt flags set in the interrupt status table, thereby detecting the module whose interrupt request line is active.

8 Claims, 6 Drawing Sheets

INTERRUPT REQUEST FROM I/O B

FIG. 6B (PRIOR ART)

MEMORY WRITE BY I/O B

FIG. 6C (PRIOR ART)

INTERRUPT REQUEST FROM I/O A

FIG. 6D (PRIOR ART)

MEMORY WRITE BY I/O A

FIG. 6E (PRIOR ART)

POLLING BY CPU

INTERRUPT CONTROL SYSTEM HAVING A PROCESSOR FOR DETERMINING SERVICE PRIORITY AMONG A PLURALITY OF MODULES ACCORDING TO AN INTERRUPT STATUS TABLE

BACKGROUND OF THE INVENTION

The present invention relates to an interrupt control system between processing modules in a data processing system having a main memory and a plurality of processing modules which are connected to a common bus.

In a conventional data processing system having a main memory and a plurality of processing modules which are connected to a common bus, interrupt control between the processing modules is performed between a central processing unit (CPU) and an I/O device.

An interrupt occurs in the following cases:

(1) at a time when the I/O device notifies the CPU of an end to I/O operation thereof, performed by an instruction from the CPU, (2) at a time when the I/O device notifies the CPU of a transient state such as power-off of the activated I/O device, and (3) at a time when the I/O device, through which connection between the CPU and another system is made, notifies the CPU that a communication to the CPU is required by the system.

The CPU detects an I/O device interrupt request signal and returns an interrupt acknowledge signal to the corresponding I/O device. When the I/O device receives the interrupt acknowledge signal, it resets the interrupt request signal.

In order to identify which of the cases (1), (2), and (3) causes a current interrupt in a conventional scheme, for example, an interrupt cause must be written in the main memory before the I/O device generates an interrupt request. The CPU accesses the main memory when the I/O device generates the interrupt request, thereby detecting the interrupt cause.

Alternatively, the interrupt cause can be transmitted from the I/O to the CPU through a data bus when the CPU returns the interrupt acknowledge signal to the I/O.

When an interrupt sequence is performed between the CPU and a plurality of I/O devices, various methods can be considered in order to permit the CPU to detect an I/O device which generates the interrupt request signal. Typical examples will be described with reference to FIGS. 1 and 2. In the conventional system of FIG. 1, interrupt request signal lines L-IRA and L-IRB are connected between the CPU and I/O devices A and B, respectively, and through these lines the CPU can detect which device generated the interrupt request signal. In another conventional system, that of FIG. 2, interrupt request signal lines L2 of I/O devices A and B are wired-OR. The CPU returns the interrupt acknowledge signal to the I/O in response to an interrupt request signal from one or a plurality of I/O devices. Among these I/O devices which request an interrupt, the I/O device having the highest priority responds to the interrupt acknowledge signal and transmits, through line L1, I/O device identification data such as an I/O device address, so that the CPU can identify the proper I/O device. In the system configuration of FIG. 2, for example, when an I/O device A generates the interrupt request signal, the device A sends its assigned device self-address to the CPU while the interrupt acknowledge signal is not being transmitted as an interrupt acknowledge signal B to the I/O device B. However, when the I/O device A does not generate the interrupt request signal, the I/O device A transmits the interrupt acknowledge signal A to the I/O device B as the interrupt acknowledge signal B through the corresponding I/O device address line. When the I/O device B generates the interrupt request signal, it sends its, assigned device self-address to the CPU. This connection technique is called a daisy chain.

The conventional interrupt control systems described above have the following drawbacks.

Figure 1:
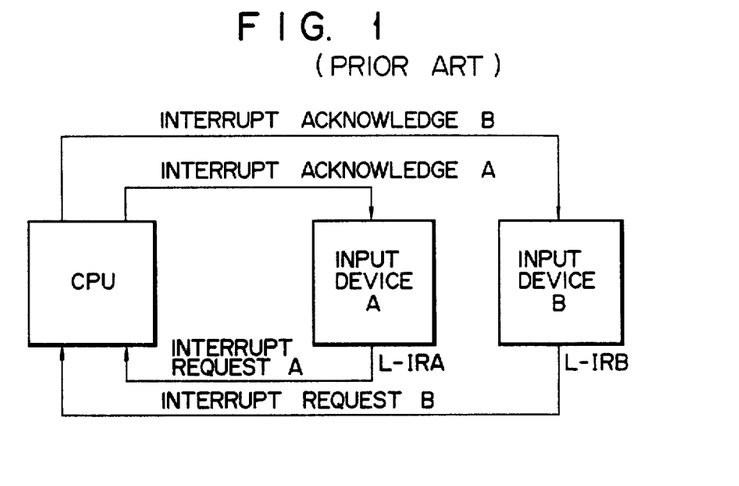
FIGS. 1 and 2 are block diagrams explaining conventional interrupt control systems.

In the system of FIG. 1, independent interrupt request lines must be arranged for asynchronous interrupt requests from a plurality of I/O devices. A large volume of hardware is required to control a large number of I/O devices, and interconnections between the devices are complex.

Figure 2:
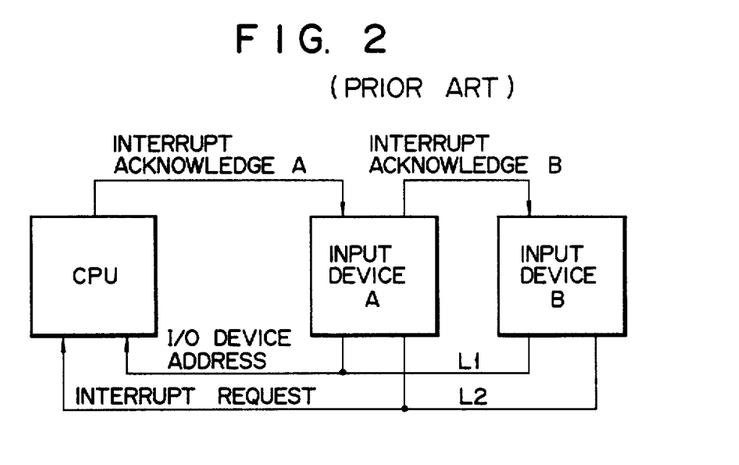

Although the system of FIG. 2 is suitable for a large scale system, I/O interrupt transmission hardware, I/O address response hardware and CPU I/O address input hardware are required. Furthermore, the interrupt priority is sequentially determined (i.e., the I/O nearest the CPU has the highest priority), and thus system flexibility is poor, resulting in inconvenience.

SUMMARY OF THE INVENTION

It is an object of the present invention to provide a flexible interrupt control system having a simple hardware configuration and suitable for a large scale system.

According to the interrupt control system of the present invention, since an interrupt request signal from each I/O device is wired-OR, and a wired-OR signal is supplied to a CPU, minimum hardware is required to perform interrupt control. The interrupt control system has a plurality of interrupt request lines, as shown in FIG. 1, in accordance with interrupt levels of the I/O devices, and wired-OR I/O devices are provided for each level. Therefore, the interrupt control system can be applied to a large scale system. When a polling sequence of an interrupt flag in the CPU is modified, the interrupt priority level of the wired-OR I/O devices can, likewise, be modified, thereby achieving flexible interrupt control.

In order to achieve the above object of the present invention, an interrupt control system is provided for use in a data processing system having a central processing unit (CPU), a main memory and a plurality of modules which are connected to a common bus, the plurality of modules being wired-OR to the CPU through interrupt request lines, wherein the main memory has an interrupt status table for storing interrupt status data of the plurality of modules; and each module has means for activating its corresponding interrupt request line and setting an interrupt flag, inherent to each module, in the interrupt status table, whereby the central processing unit responds to the active interrupt request line, polls the interrupt status table and identifies the module which generates the interrupt request signal.

BRIEF DESCRIPTION OF THE DRAWINGS

Other objects and features of the present invention will be apparent from the following description taken in connection with the accompanying drawings, in which:

FIGS. 6A through 6E are timing charts for identifying I/O interrupt request signals with an I/O to which the CPU sends an interrupt acknowledge signal; in which FIGS. 7A through 7E are timing charts explaining identification of I/O interrupt request signals with the I/O to which the CPU sends the interrupt acknowledge signal in the system of FIG. 3; in which

DETAILED DESCRIPTION OF THE PREFERRED EMBODIMENT

An interrupt control system according to an embodiment of the present invention will be described with reference to the accompanying drawings.

Figure 3:
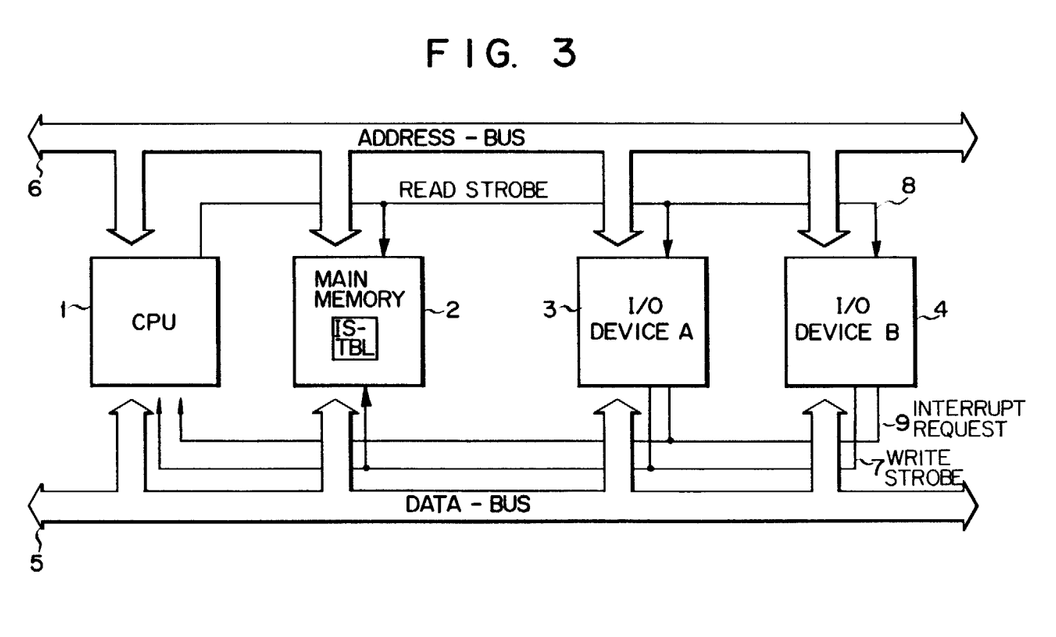
FIG. 3 is a block diagram of an interrupt control system according to an embodiment of the present invention.

FIG. 3 is a block diagram of the interrupt control system according to the embodiment of the present invention. The interrupt control system is arranged in connection with a central processing unit 1 (to be referred to as a CPU hereinafter), a main memory 2, an input/output device 3 and an input/output device 4 in a data processing system. The CPU 1, the memory 2 and the devices 3 and 4 are connected to data and address buses 5 and 6. A read strobe signal 8 and a write strobe signal 7 are supplied to the CPU 1, the memory 2 and the devices 3 and 4. An interrupt request signal 9 as a wired-OR signal from the devices 3 and 4 is supplied to the CPU 1.

Figure 4:
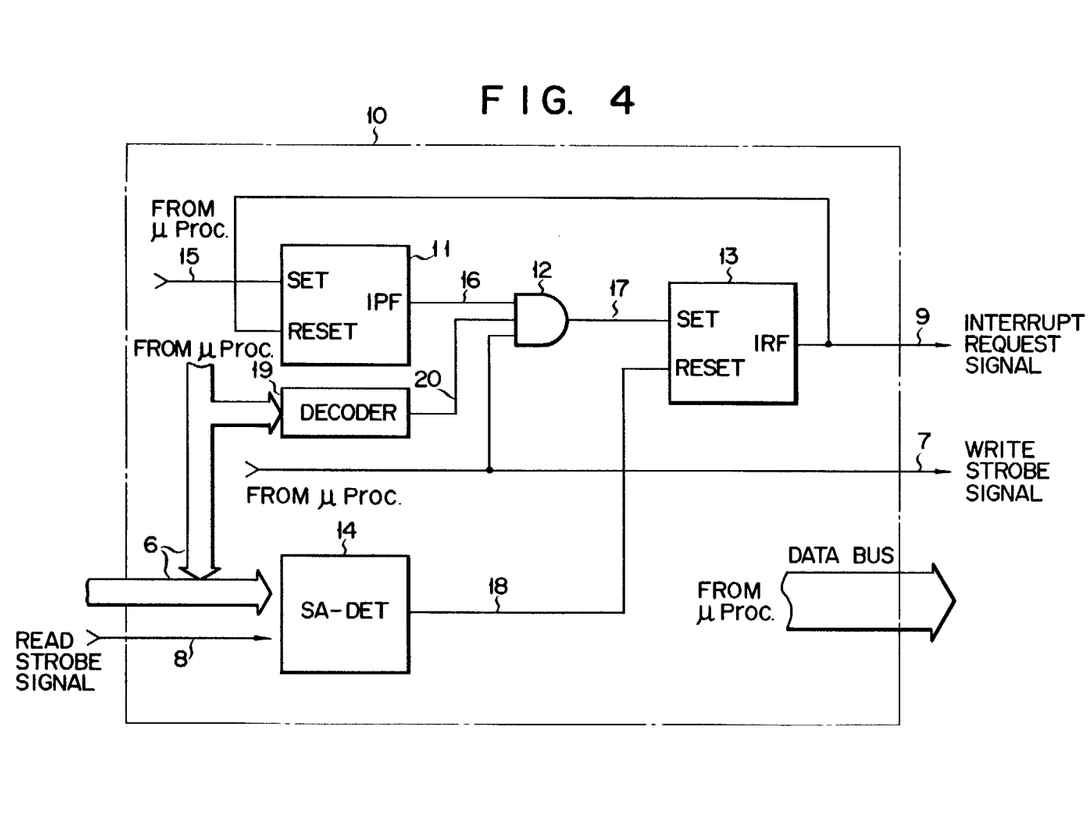
FIG. 4 is a detailed block diagram of an interrupt controller incorporated in I/O device 3 or 4 in FIG. 3.

FIG. 4 is a detailed block diagram of the interrupt controller 10 incorporated in the I/O device shown in FIG. 3. The controller 10 comprises an interrupt preset flip-flop (F/F) 11, an interrupt request flip-flop (F/F) 13, an AND gate 12, a self address detector (SA-DET) 14 and a decoder 19. The flip-flop 11 is set in response to a set signal supplied from a microprocessor (not shown) in the controller 10, and generates an interrupt preset flag output signal 16. A decoder 19 decodes an address signal (to be described later) for an interrupt status table (IS-TBL). The output 16, a decoded output 20 from the decoder 19 and the signal 7 are supplied to the AND gate 12. An output signal from the AND gate 12 is supplied to the set terminal of the F/F 13. An I/O device address and a read strobe signal are supplied from the CPU 1 to the detector 14. The detector 14 checks whether or not the I/O device address supplied from the CPU is a selfaddress; more specifically, whether or not one of the addresses (e.g., a start address) in the address space corresponding to each I/O device in a system address space (to be described later) has been supplied to the detector 14. The detector 14 comprises, for example, a comparator or a decoder. Depending upon whether the detector 14 is a comparator or a decoder, it either, compares or decodes the start address which is assigned to an I/O device owning it as the self address. When a coincidence is established, the comparator generates an active coincidence signal 18.

The output signal 18 from the detector 14 is connected to the reset terminal (RESET) of the flip-flop 13. The output from the decoder 19 is active when the interrupt status table (to be described in detail later) is accessed.

Figure 5:
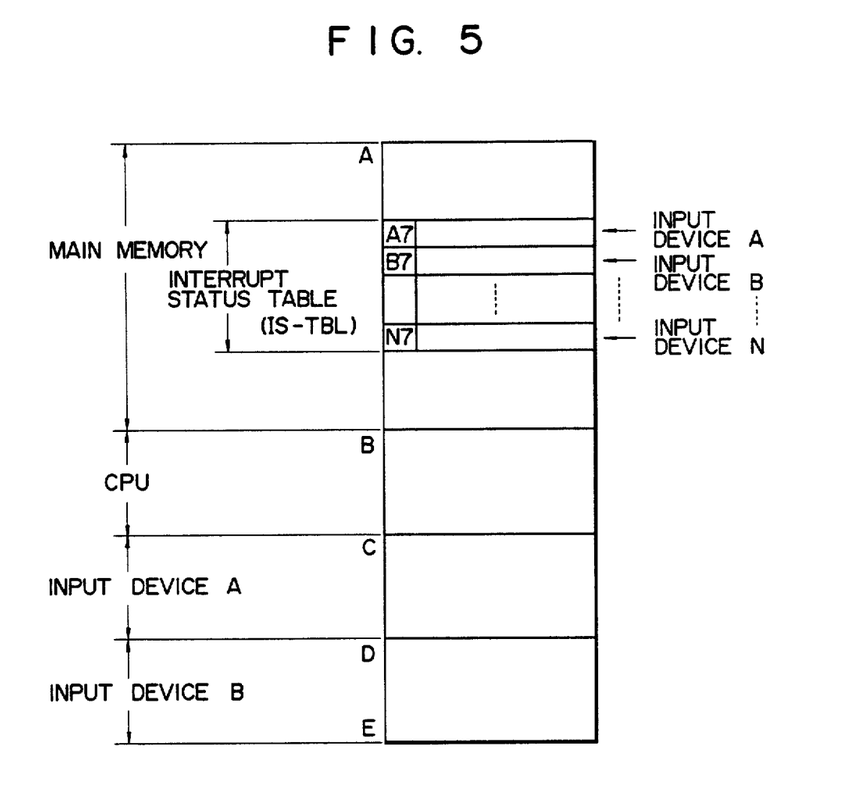
FIG. 5 shows a format of a system address space in the system of FIG. 3.

FIG. 5 shows the system address space corresponding to the system architecture. In address spaces A through E, the spaces A through B-1, the spaces B through C-1, the spaces C through D-1 and the spaces D through E are assigned for the memory 2, the CPU 1 and the I/O devices 3 and 4, respectively. The interrupt status table is arranged in A through B-1 in the memory 2 and has interrupt flags A7 through N7 respectively and inherently corresponding to I/O devices A through N.

The operation of the interrupt control system of this embodiment will be described with reference to FIGS. 3 through 5. When an interrupt is caused in the I/O device (A)3 of FIG. 3, the microprocessor (not shown) in the I/O device (A)3 gains control of the bus 5 over the CPU 1 and emits the write strobe signal onto the signal line 7, in addition to which it emits the address in the interrupt status table (IS-TBL) assigned to the I/O device (A)3 onto the address bus 6. Simultaneously, the microprocessor in the I/O device (A)3 produces data (data having the active bit corresponding to the flag position) to set the corresponding flag of the interrupt status table (IS/TBL) onto the data bus 5.

As a result, the interrupt flag A7 corresponding to the I/O device (A)3 in IS-TBL is set. At this time, the interrupt request signal 9 from the I/O device (A)3 is output to the CPU 1. Upon reception of the interrupt request signal, the CPU 1 starts interrupt processing.

Upon reception of the signal 9, the CPU 1 starts polling each entry of the IS-TBL and reads the interrupt flags A7, B7, . . . N7 respectively in order to detect which I/O device generated the interrupt request signal. In this embodiment, since the flag A7 is set, the CPU 1 recognizes that the interrupt request signal has been generated by the device (A)3. The CPU 1 resets the interrupt flag A7 and sends to all I/O devices an address corresponding to the device (A)3 in the system address space of FIG. 5; that is, the start address (among addresses C through D-1 in the system address space) assigned to the device (A)3. At the same time, the CPU 1 generates the read strobe signal 8 to all I/O devices. While all I/O devices receive the start address transmitted from the CPU 1, only detector 14 in device A(3) recognizes the start address as the interrupt acknowledge signal. Detector 14 of the device (A)3 then generates the active coincidence signal 18 and the interrupt request signal 9 from the device 3 is reset.

Interrupt request processing will be described with reference to FIGS. 7A through 7E when a conflict between the interrupt request signals from the devices 3 and 4 occurs.

Figure 7A:
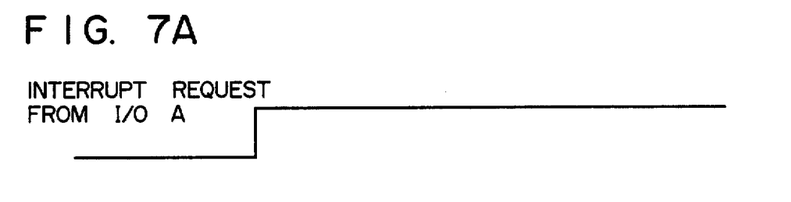
FIG. 7A shows an interrupt request signal from the I/O A.
Figure 7B:
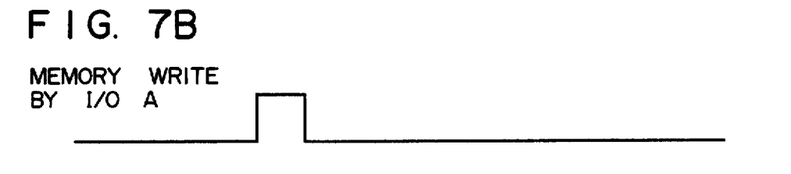
FIG. 7B shows a timing at which the I/O A writes an interrupt cause in the main memory of the CPU.

(1) The device 3 sets the flag A7 in the IS-TBL, as shown in FIG. 7B. At the same time, as shown in FIG. 7A, the device 3 sets the signal 9.

Figure 7C:
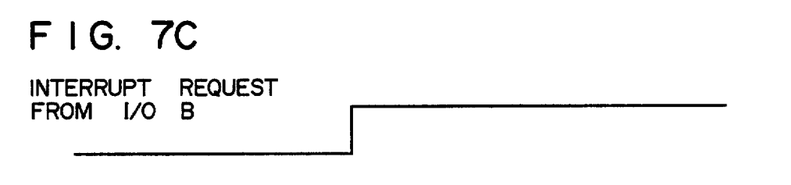
FIG. 7C shows an interrupt request signal from the I/O B.
Figure 7D:
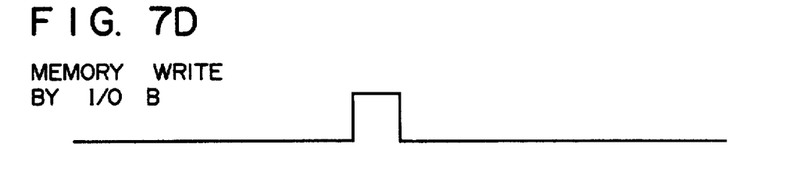
FIG. 7D shows a timing at which the I/O B writes an interrupt cause in the main memory of the CPU and FIG. 7E shows a polling timing of the CPU.

(2) The device 4 sets the flag B7 in the IS-TBL, as shown in FIG. 7D. At the same time, as shown in FIG. 7C, the device 4 sets the signal 9.

Figure 7E:
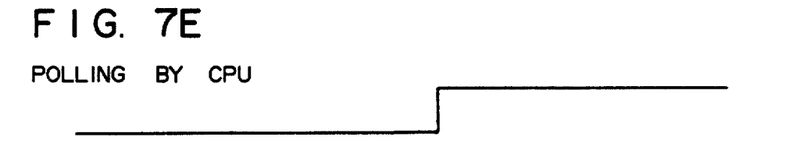

(3) The CPU 1 performs, as shown in FIG. 7E, polling in the order of A7, B7, ... N7 to check the signals 9 to determine which flags in the IS-TBL in the memory 2 are set.

(4) Since the flag A7 is set, the CPU 1 recognizes that the interrupt request signal has been generated from the device 3, and resets the flag A7. In the same manner as described above, the interrupt acknowledge signal is returned to the device 3 whose IRF 13 is reset.

(5) Since the signal 9 from the device 4 is kept set though the signal 9 from the device 3 has been reset, interrupt processing is started again to detect that the flag B7 is set.

(6) The CPU 1 resets the flag B7 and returns the interrupt acknowledge signal to the device B4.

(7) The device 4 resets the interrupt request signal 9.

As may be apparent from FIGS. 7A through 7D, the interrupt request signal 9 is generated simultaneously when the interrupt flags in para (1) and para (2) are set within a single bus cycle.

When this simultaneous processing is not performed, i.e., in the conventional interrupt control system, the operation shown in FIGS. 6A through 6E is performed.

Figure 6A:
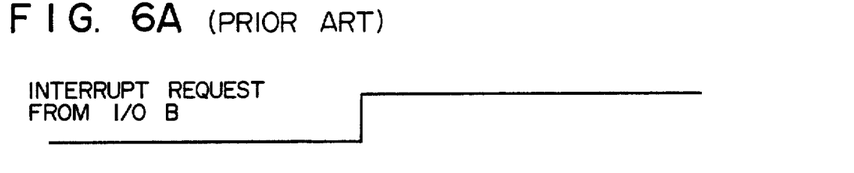
FIG. 6A shows an interrupt request signal from an I/O B.
Figure 6B:
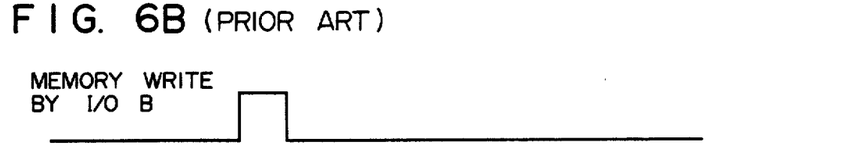
FIG. 6B shows a timing at which an I/O B writes an interrupt cause in the main memory of the CPU.
Figure 6C:
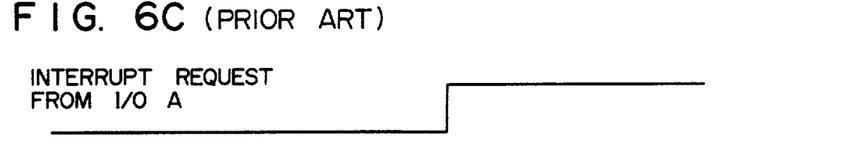
FIG. 6C shows an interrupt request signal from an I/O A.

As shown in FIG. 6B, assume that the device B sets the flag B7.

Subsequently, the device (B)4 sends the interrupt request signal to the CPU 1, as shown in FIG. 6A.

Figure 6D:
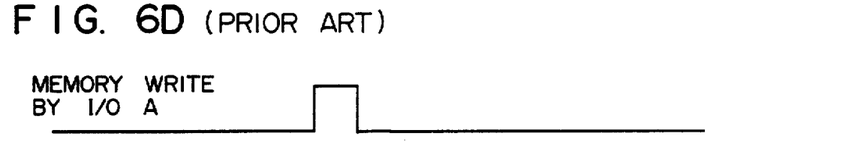
FIG. 6D shows a timing at which the I/O A writes an interrupt cause in the main memory of the CPU and FIG. 6E shows a polling timing of the CPU.
Figure 6E:
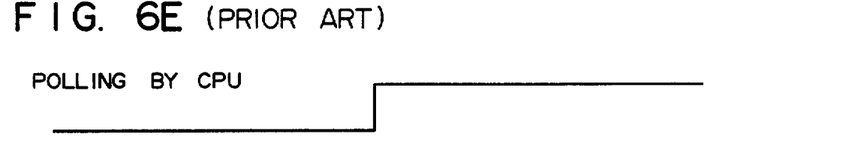

The CPU 1 starts polling the IS-TBL in the main memory in response to the interrupt request signal. Assume that the device (A)3 sets the flag A7, as shown in FIG. 6D, before the CPU 1 refers to the IS-TBL. When the CPU 1 starts polling the IS-TBL in this state, the CPU 1 detects that the flag A7 is set. The CPU 1 returns the interrupt acknowledge signal to the device (A)3, although the device (A)3 has not yet generated the interrupt request signal.

In order to prevent the above problem, the interrupt flag must be set simultaneously with transmission of the interrupt request signal.

An interrupt control system for achieving the above-mentioned control is shown in FIG. 4. The microprocessor in the controller 10 supplies an interrupt preset flag set signal 15 to set the interrupt preset flag 11 before the interrupt request flag 13 is set. Subsequently, the microprocessor supplies its assigned address of the IS-TBL, data, and a write strobe signal to the main memory 2 for setting an interrupt flag in the IS-TBL the address is received by the decoder 19. The decoder 19 generates an active signal 20, so that the AND gate 12 generates a set signal for IRF 13 at the write strobe timing. The IRF 13 is set and generates the signal 9. At the same time, the signal 9 is fed back to the reset terminal of the IPF 11 which is then reset. In this manner, the interrupt request signal is preset for generation when the IS-TBL address is generated. Therefore, the interrupt request signal can be generated simultaneously with the setting of the interrupt flag.

The detector (SA-DET) 14 compares the self-address with the address supplied as the interrupt acknowledge signal from the CPU 1 through the bus 6. When coincidence is established, the detector 14 generates a coincidence signal. The coincidence signal is supplied to the reset terminal of the IRF 13 which is then reset.

What is claimed is:

1. A data processing system comprising:
   data processing means for controlling system operation;
   a plurality of modules which request interrupts for requesting services from said data processing means;
   memory means for storing information to be processed by said data processing means, said memory means including a plurality of memory locations assigned to each of said modules respectively;
   each of said modules including writing means for writing interrupt status data to a corresponding one of said memory locations for requesting an interrupt for the writing module, and means for generating an interrupt request signal to notify said data processing means that an interrupt request has occurred in the system, concurrently with said writing interrupt status data;
   an interrupt request line, connected to said modules and said data processing means, for wired-ORing said interrupt request signals output by any of said modules, and transmitting said wired-ORed request signals to said data processing means; and
   said data processing means receiving said wired-ORed interrupt request signals and recognizing that any of said modules requests an interrupt, responsive to said recognition of said wired-ORed interrupt request signals, reading said interrupt status data from each of said memory locations to determine which of said modules is to be serviced.

2. A data processing system according to claim 1, wherein said data processing means changes an order of reading said interrupt status data from each of said memory locations in order to change a priority level for servicing each of said modules.

3. A data processing system according to claim 1, wherein said data processing means further includes:
   means responsive to said interrupt status data read from said memory means, for supplying said module to be serviced with the address data assigned to aid module to be serviced in order to signal acknowledgement of said interrupt request; and
   each of said modules including terminating means for terminating said interrupt request signal in response to receipt of said address data assigned thereto.

4. A data processing system according to claim 3, wherein each of said modules further includes a module address detecting means for detecting that said module address data assigned thereto has been received.

5. A data processing system according to claim 1, wherein said means for generating an interrupt request signal of each of said modules includes:
   interrupt preset means for temporarily storing an interrupt request condition of said modules before said writing means writes said interrupt status data into said memory means; and
   sending means, responsive to said interrupt request condition stored in said interrupt preset means when said writing mean writes the interrupt status data, for sending said interrupt request signal to said interrupt request line.

6. A data processing system according to claim 1, wherein said writing means includes internal processing means for sending the interrupt status data, a memory address data corresponding to one of said locations of said memory means assigned to the writing module, and a write strobe signal to said memory means.

7. A data processing system according to claim 6, wherein said internal processing means of each of said modules includes means for generating an interrupt request preset signal, and said means for generating an interrupt request signal of each of said modules includes interrupt preset means responsive to said interrupt request preset signal for temporarily storing the interrupt request condition of said module before said writing means writes said interrupt status data into said memory means; and wherein said data processing system includes:

memory address detecting means for detecting said memory address data sent by said internal processing means; and sending means, responsive to said interrupt request condition stored in said interrupt preset means and an output of said memory address detecting means when said writing means writes the interrupt status data, for sending said interrupt request signal to said interrupt request line.

8. A data processing system according to claim 1, further comprising a common bus for interconnecting said processing means, said memory means, and said modules, and wherein said writing means includes means for controlling said common bus over said processing means to write said interrupt status data into said memory means, and said means for generating said interrupt request signal starts to generate said interrupt request signal while said means for controlling maintains control of said common bus.

* * * * *